(12) United States Patent
Xu et al.

(10) Patent No.: US 9,176,681 B1
(45) Date of Patent: Nov. 3, 2015

(54) MANAGING PROVISIONING OF STORAGE IN STORAGE SYSTEMS

(71) Applicant: EMC Corporation, Hopkinton, MA (US)

(72) Inventors: Yan Xu, Boston, MA (US); Piers Changyong Yu, Shanghai (CN); Alex Zhongbing Yang, Shanghai (CN); Michael C. Brundage, Lexington, SC (US); Kamakshi Viswanadha, Lexington, MA (US); Yining Si, Shrewsbury, MA (US); Steve Zhuxiong Ai, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 182 days.

(21) Appl. No.: 13/832,636

(22) Filed: Mar. 15, 2013

(51) Int. Cl.
*G06F 12/02* (2006.01)
*G06F 3/06* (2006.01)
*G06F 17/30* (2006.01)
*G06F 11/20* (2006.01)

(52) U.S. Cl.
CPC .............. *G06F 3/0689* (2013.01); *G06F 3/067* (2013.01); *G06F 3/0619* (2013.01); *G06F 3/0631* (2013.01); *G06F 11/2094* (2013.01); *G06F 17/30* (2013.01)

(58) Field of Classification Search
CPC . G06F 11/2094; G06F 3/0631; G06F 3/0619; G06F 3/0689; G06F 3/0665; G06F 3/067
See application file for complete search history.

(56) References Cited

U.S. PATENT DOCUMENTS

| | | | |
|---|---|---|---|
| 7,631,155 B1 * | 12/2009 | Bono et al. | 711/156 |
| 7,882,386 B1 * | 2/2011 | Potnis et al. | 714/2 |
| 8,037,345 B1 * | 10/2011 | Iyer et al. | 714/6.12 |
| 2005/0108292 A1 * | 5/2005 | Burton et al. | 707/200 |
| 2012/0096235 A1 * | 4/2012 | Lehr et al. | 711/171 |
| 2014/0019706 A1 * | 1/2014 | Kanfi | 711/171 |
| 2014/0244691 A1 * | 8/2014 | Reddy et al. | 707/790 |

* cited by examiner

*Primary Examiner* — Hiep Nguyen
(74) *Attorney, Agent, or Firm* — Krishnendu Gupta; Jason A. Reyes; Deepika Bhayana (57) ABSTRACT

A method is used in managing provisioning of storage in storage systems. Whether a logical object requires a slice for recovering the logical object is determined. Based on the determination, storage for the slice is provisioned. The slice is provided to the logical object.

18 Claims, 9 Drawing Sheets

MANAGING PROVISIONING OF STORAGE IN STORAGE SYSTEMS

BACKGROUND

1. Technical Field

This application relates to managing provisioning of storage in storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

SUMMARY OF THE INVENTION

A method is used in managing provisioning of storage in storage systems. Whether a logical object requires a slice for recovering the logical object is determined. Based on the determination, storage for the slice is provisioned. The slice is provided to the logical object.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in managing provisioning of storage in storage systems, which technique may be used to provide, among other things, determining whether a logical object requires a slice for recovering the logical object, based on the determination, provisioning storage for the slice, and providing the slice to the logical object.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A pool may include a set of storage tiers. A storage tier may include storage devices of similar or same performance capabilities and cost. However, a pool may have storage devices of different performance capabilities and costs. Both pool and storage tier contain slices. A slice may be considered the smallest element that can be tracked and moved. A storage tier or a storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

The loss or corruption of any of numerous types of metadata of a file system organized on a storage system can result in inconsistencies or corruption of the file system. For example, metadata in file systems may be corrupted so that two or more file systems both indicate that they own the same slice, resulting in inconsistencies as to which file system actually owns the slice and has the ability to control and overwrite the slice. It should be appreciated that such corruptions or inconsistencies may develop in any one of numerous ways, including hardware failures, software bugs, and so on. In addition, it should be appreciated that the types of inconsistencies and problems with file systems described above herein are described merely for illustrative purposes, and that numerous other types of inconsistencies or problems are possible.

File system mapping logic in a storage system provides a thin provisioning service by adding fixed sized slices to a file system when the file system needs storage space to write data. In such a case, when a file system requires a slice, the file system sends a request to provision the slice to a slice manager component of a storage system. A slice request framework manages requests to provision slices.

Generally, a slice request framework in a data storage system manages provisioning of slices to a mapped LUN associated with a file system such that the slice request framework adds a slice to the file system or a volume of the file system when the slice request framework receives a request to provision the slice. A file system may need to provision a slice when the file system requires storage space for writing data. A file system may also need to provision a slice when a file system recovery mechanism such as FSCK utility and volume recovery logic requires a slice to recover metadata of the file system. In such a case, a file system may require a slice to perform operations such as duplicate metadata and add metadata.

In a conventional system, a conventional slice request framework provisions slices for only those file systems which have been mounted and are in active state. Thus, in such a conventional system, the conventional slice request framework only provisions slices for a file system which is not in a faulted state, unstable state or being initialized. As a result in such a conventional system, it is difficult or impossible to create and send a request to provision a slice for a file system which is not mounted. Further, in such a conventional system, when a recovery mechanism such as a FSCK utility or volume recovery logic attempts to recover a file system or a volume of the file system in order to restore the integrity of the file system or volume by resolving inconsistencies found during validation of metadata, the recovery mechanism may require a new slice for storing metadata. However, generally, a file system or volume which is recovered by a recovery mechanism is not mounted on a storage system. Thus, in such a conventional system, the recovery mechanism such as a FSCK utility fails to recover a file system or volume when a new slice is requested by the recovery mechanism because the file system is not mounted. As a result, in such a conventional system, a recovery mechanism may not be able to recover a file system at all thereby causing unavailability of user data. Alternatively, in such a conventional system, upon failure to provision a new slice for a file system or volume of the file system, a recovery mechanism may need to restart restoring the file system or volume and may require a user to add the slice manually. Consequently, in such a conventional system, a user may need to take a file system or volume offline and perform a complicated manual recovery procedure to restore the file system or volume. As a result, in such a conventional system, it may be difficult or impossible for a storage system to recover a file system thereby causing a data loss and/or data unavailable situation. Thus, in such a conventional system, no slice is added to a file system or volume which is being recovered as the conventional slice request framework does not include a logic to provision slices for unmounted file systems.

By contrast, in at least some implementations in accordance with the technique as described herein, the current technique provisions slices for a file system which is un-mounted. Thus, in at least one embodiment of the current technique, a slice may be added to a volume or file system which is being recovered by a recovery mechanism. Further, in at least one embodiment of the current technique, a slice request framework is able to add slices to an un-mounted volume or un-mounted file system under going recovery.

In at least some implementations in accordance with the current technique as described herein, the use of the managing provisioning of storage in storage systems technique can provide one or more of the following advantages: improving efficiency of a data storage system by efficiently provisioning slices for a volume or file system, improving performance of a recovery process by provisioning slices for un-mounted file systems, and reducing unavailability of a LUN by efficiently recovering the LUN.

Figure 1:
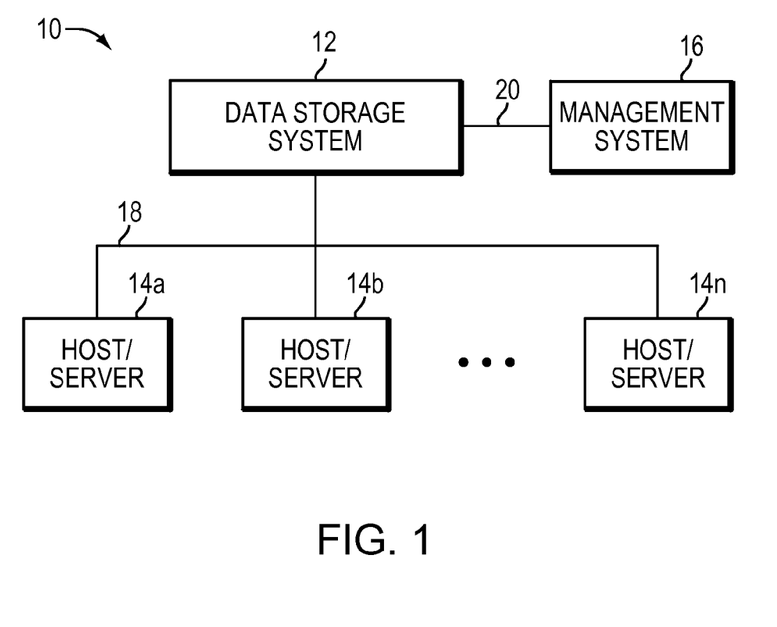
FIGS. 1-2 are examples of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
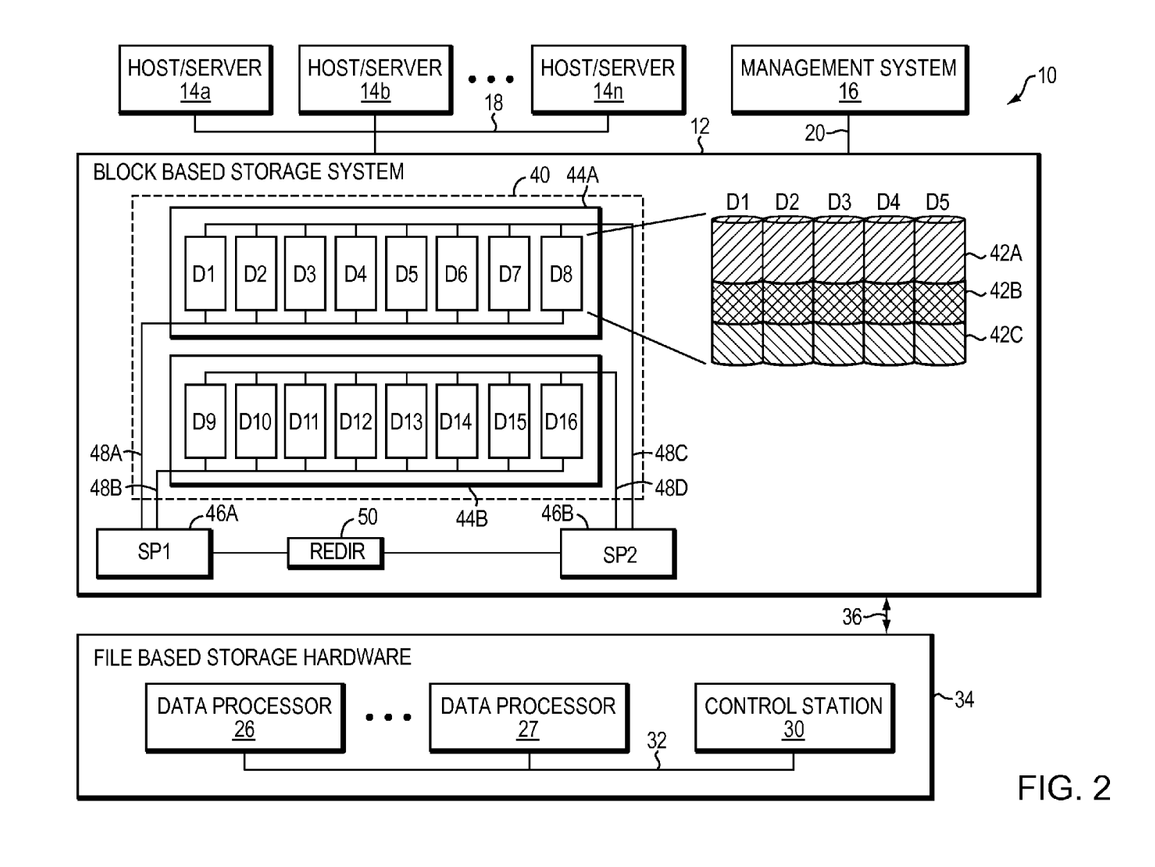

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hard-wired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
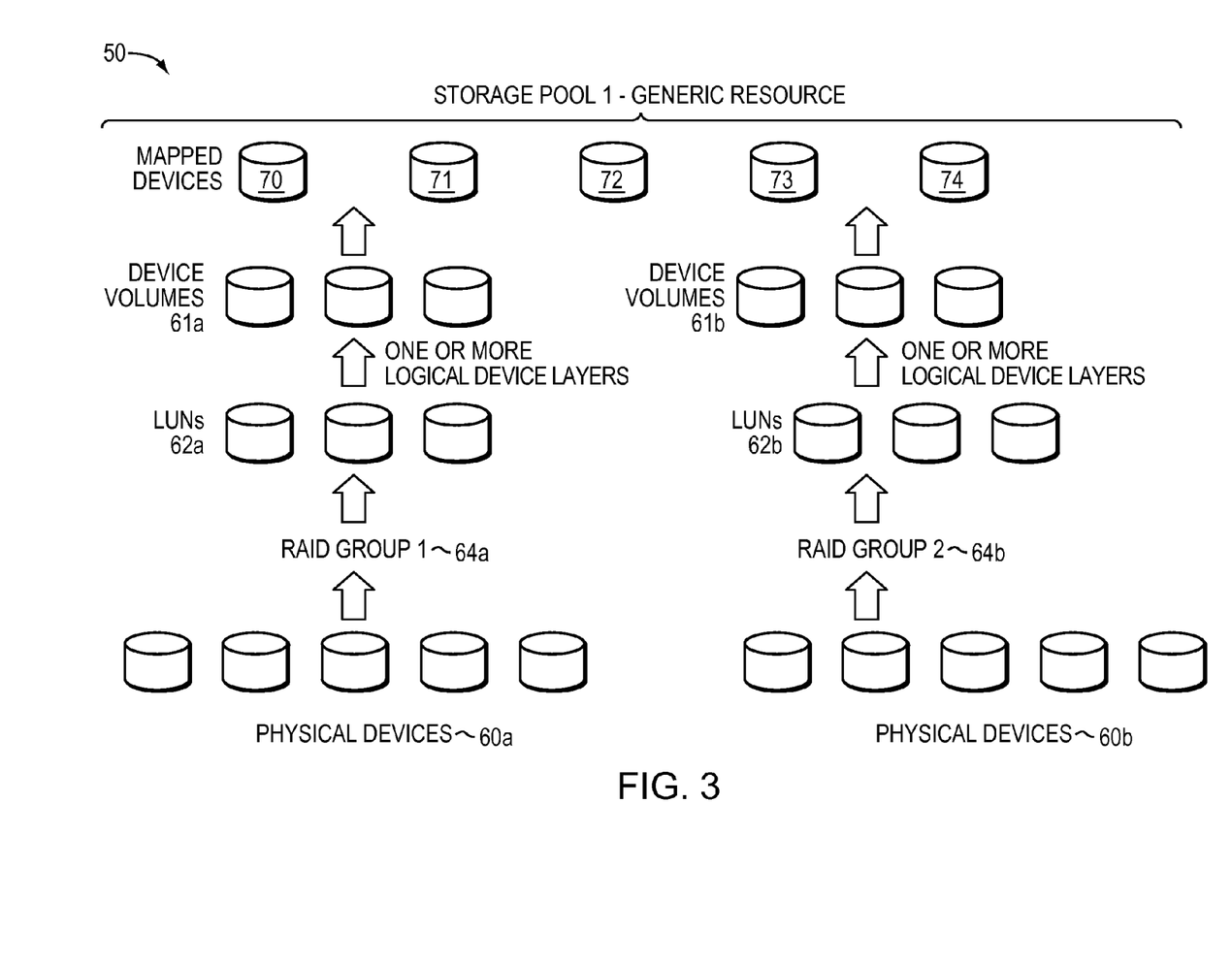
FIGS. 3 and 4 are examples illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4:
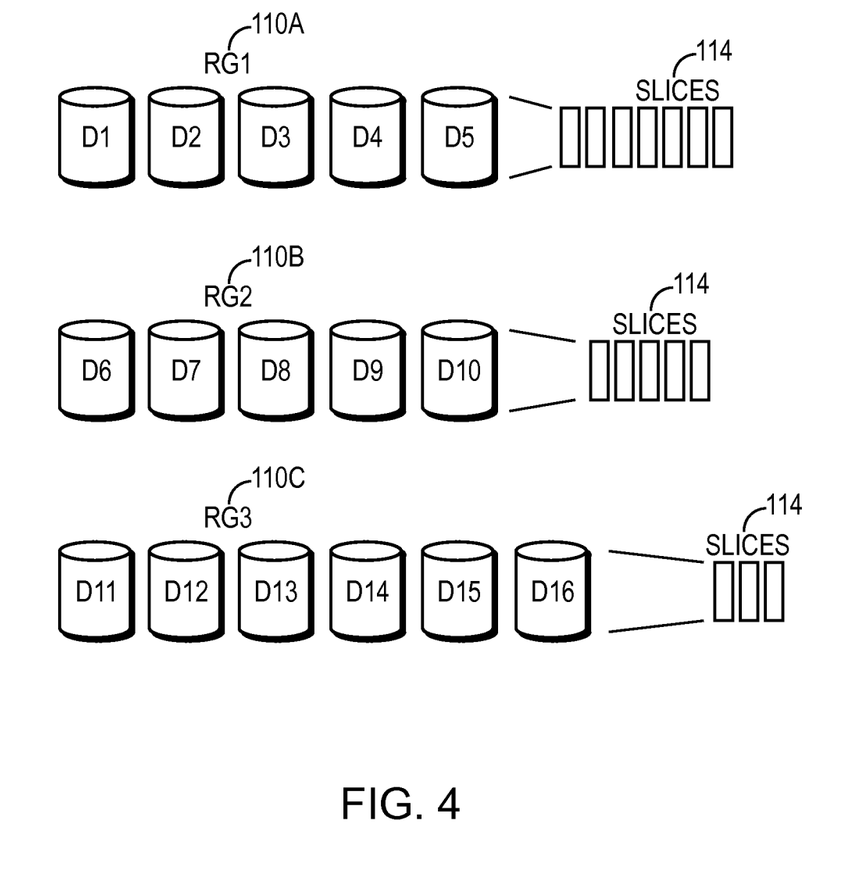

Referring to FIG. 4, shown is a diagram illustrating an exemplary logical division of storage of a data storage system into storage objects (such as RAID groups) for managing provisioning of storage in the data storage system that may be included in an embodiment using the techniques described herein. With reference also to FIGS. 1 and 2, for example, a storage entities may refer to either a single storage device or a RAID group operating as a single storage device, may be further sub-divided into logical units. A single RAID group or individual storage device may contain one or more logical units (LUs). However, RAID groups need not correspond to LUs and RAID groupings may be further divided into two or more LUs. In addition to RAID groups, each logical unit may be further subdivided into portions of a logical unit, referred to as "slices" 114. Slices 114 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 46A, 46B. The slice manager may be responsible for implementing a slice allocation policy and/or algorithm. For example, the slice manager may receive slice allocation requests, and maintain relevant statistical information regarding slices.

Figure 5:
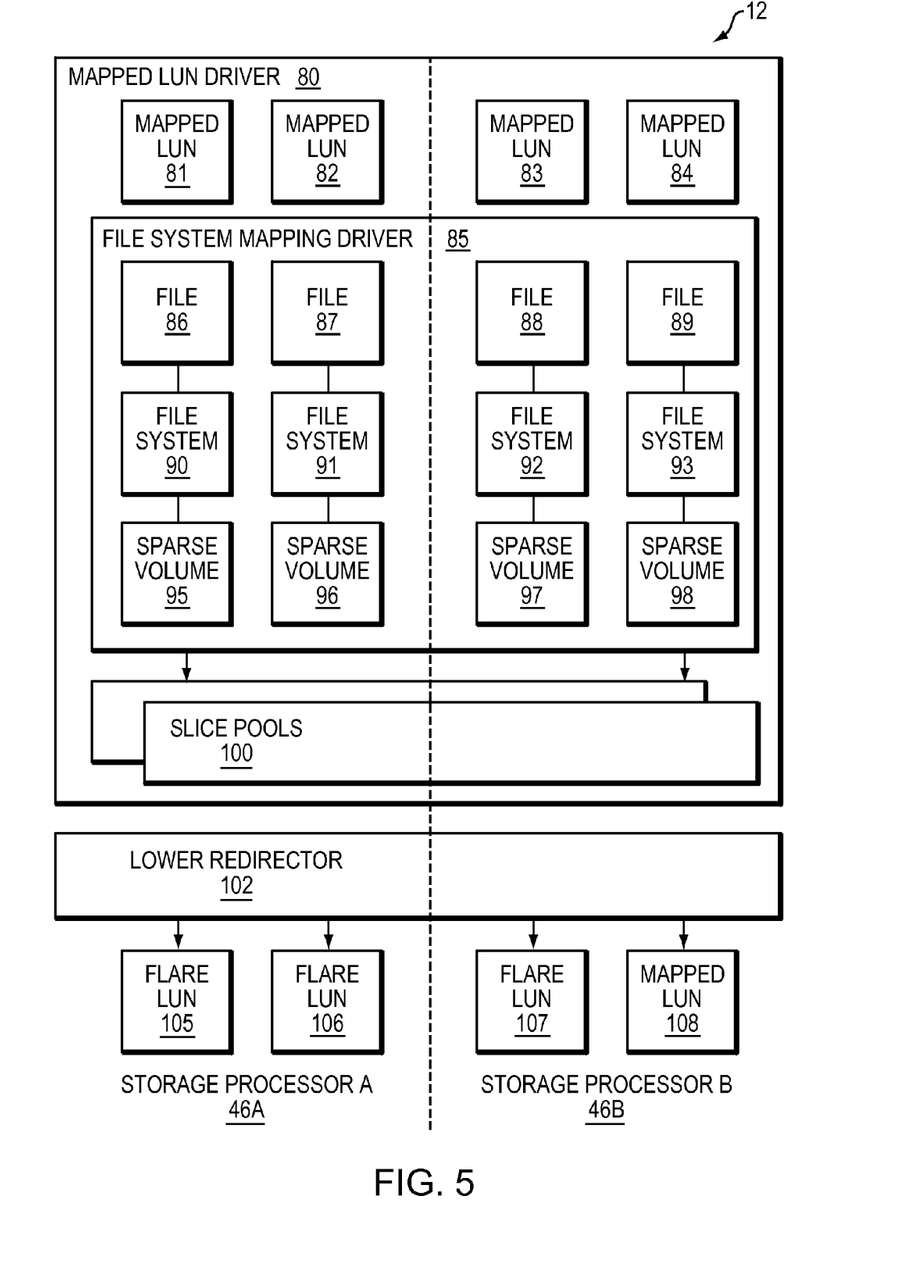
FIGS. 5-8 are block diagrams illustrating in more detail components that may be used in connection with techniques herein.

Referring to FIG. 5, shown is more detailed example of an embodiment of a computer system that may be used in connection with performing the techniques described herein. With reference also to FIGS. 1-4, in a data storage system such as data storage system 12, a storage processor provides communications between host 14 and disk drives 60. Data storage system 12 includes at least two storage processors 46A, 46B. Both storage processor A (SPA) 46A and storage processor B (SPB) 46A provides access to Flare LUNs 105-108 built from a storage space provided by disk drives 60. Generally, a Flare LUN can only be accessed by one storage processor. Lower redirector 102 interacts with storage processors 46A, 46B to access Flare LUNs 105-108. The access to Flare LUNs 105-108 is independent of which storage processor each Flare LUN belongs to. A user of data storage system 12 allocates storage from Flare LUNs in fixed sized chunks. Each fixed size chunk is known as a slice. One or more slices are grouped together to create a slice pool. Host system 14 provisions storage from slice pools 100 for creating mapped LUNs 81-84. A mapped LUN is a LUN that is visible to host system 14 and a user of a data storage system. A mapped LUN may be a thin LUN (TLU) or a direct LUN (DLU). The size of a thin LUN is independent of amount of available storage. Typically, storage is allocated to a thin LUN when host system 14 issues a write request and needs a data block to write user's data. The size of a direct LUN is dependent of amount of available storage. Typically, storage is allocated to a direct LUN at the time the direct LUN is created and initialized. File system mapping driver 85 is a lightweight file system library that provides file system functionality and allows data storage system 12 to create files within a file system. File system mapping driver 85 processes I/Os directed to metadata of a file system. Mapped LUN driver 80 processes I/Os directed to data of the file system. Mapped LUN driver 80 also provides slices of storage from slice pools 100 to file system mapping driver 85 for creating a file system. Slices of storage can be dynamically added or removed by a file system. When a slice is removed, the file system redistributes data stored on the slice to other slices in the file system. File system mapping driver 85 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 85 into a logical contiguous address space on which a file system is created. The sparse volume maintains logical to physical mapping for slices of storage in a slice database for the slices that are provisioned to address space of the sparse volume and are in use. Further, the file system maintains a bitmap for every slice of physical storage which is in use by the file system such that the bitmap includes information regarding the entire address space of the file system. A mapped LUN presents a file as a LUN to host system 11. Further, the file presents a contiguous logical address space to the mapped LUN. For example, in FIG. 5, mapped LUN 81 presents file 86 as a LUN to host system 11, file 86 is created in a file system 90 and file system 90 is created from sparse volume 95. Similarly, mapped LUNs 82-84 presents file 87-89 as LUNs respectively to host system 11, files 87-89 are created in file systems 91-93 respectively and file systems 91-93 are created from sparse volumes 96-98 respectively. Further, sparse volumes 95-98 are created from slices of physical storage included in slice pools 100.

Figure 6:
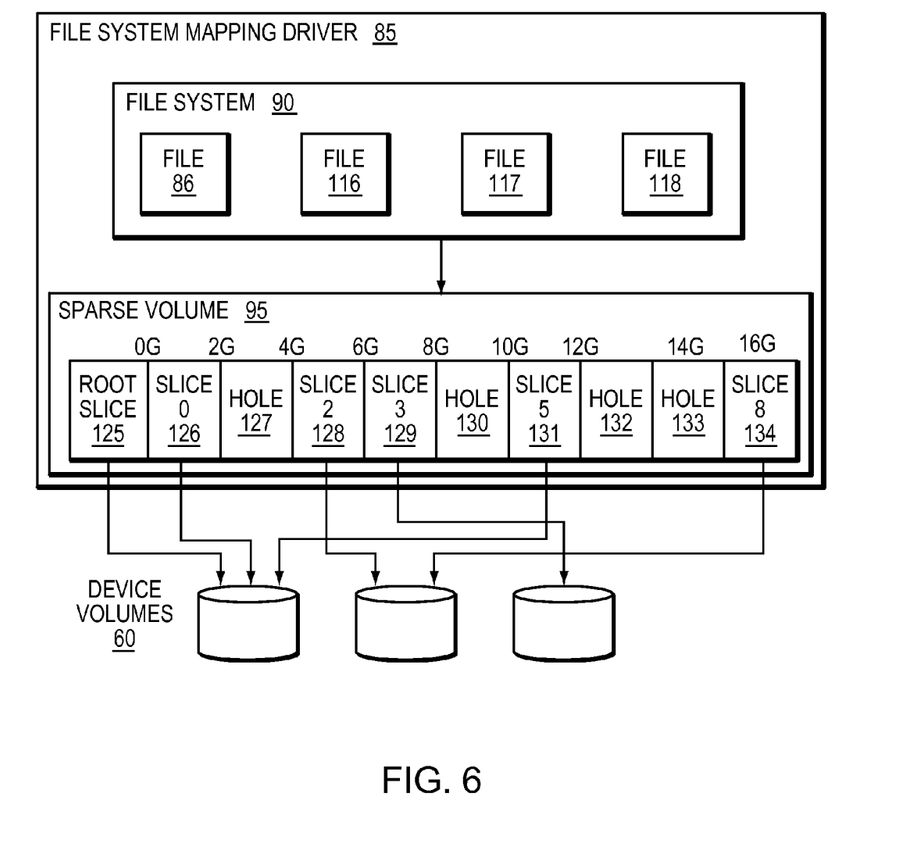

Referring to FIG. 6, shown is more detailed representation of a file system mapping driver 85 that may be included in an embodiment using the techniques herein. Sparse volume 95 aggregates one or more slices of physical storage together into a contiguous logical address space while some of these slices may or may not be provisioned. A provisioned slice has physical storage space allocated for storing data in the provisioned slice. For example, in FIG. 6, sparse volume 95 aggregates slices 125-134 together into a logical address space of 16 gigabyte (GB), where each slice is 1 gigabyte (GB) in size. However, it should be noted that each slice may be 256 megabyte (MB) or 512 megabyte (MB) in size as well. Root slice 125 and Slice-0 126 in a sparse volume are always provisioned, such that a storage space is available to store metadata information for slices included in the sparse volume 95. File system 90 is created from the contiguous logical address space provided by the sparse volume 95. A user of data storage system 12 creates files 86, 116-118 in file system 90. Each provisioned slice of a sparse volume has a corresponding configured slice object that is mapped to a corresponding LUN of physical storage included in device volumes 60. In at least some implementations, root slice 125 may be defined independently of the slice-0. Additionally, root slice 125 holds logical to physical address mapping for sparse volume 95.

At any given time, a storage space for a file system is either allocated (also referred to as provisioned) or not. If a storage space for a file system is not allocated, then there is said to be a hole at that location in a logical extent of the file system. For example, in FIG. 6, logical address space of sparse volume 95 has four holes 127, 130, 132, 133 indicating that slices corresponding to those locations are not provisioned.

Figure 7:
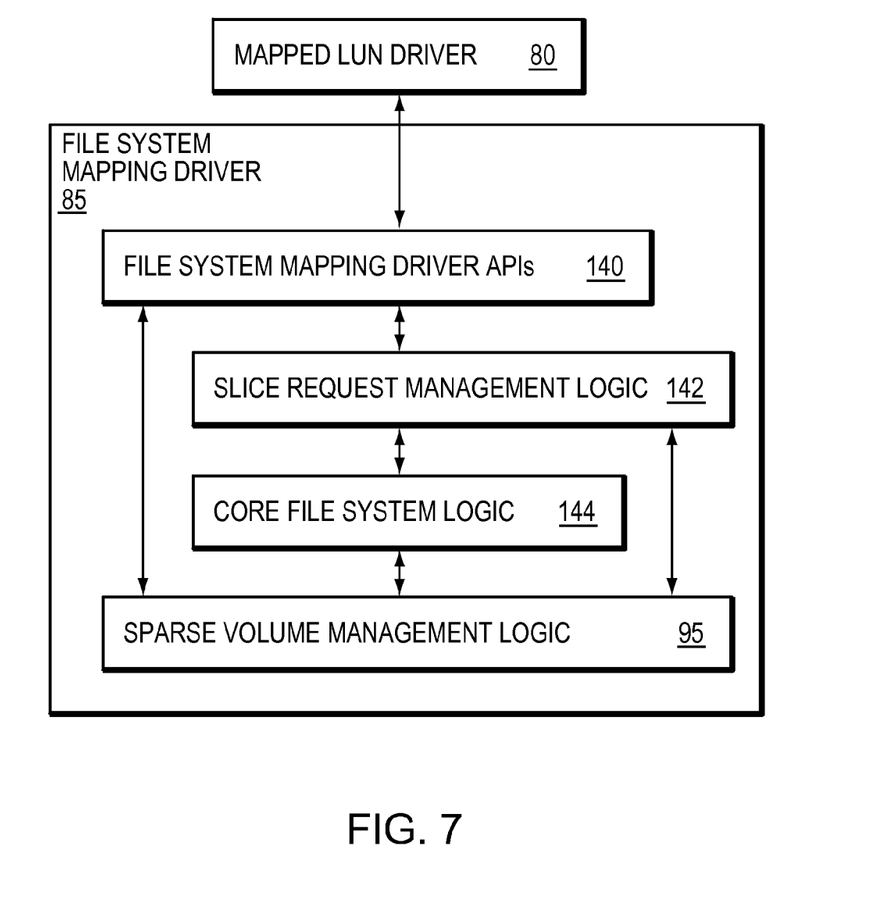

Referring to FIG. 7, shown is a more detailed representation of components that may be included in an embodiment using the techniques described herein. In at least some embodiments of the current technique, requests to provision slices for a file system or a volume of the file system are processed irrespective of the state of the file system. A request to provision a slice may be received from core file system logic 144 which may include a logic to recover a file system. Further, a request to provision a slice may be received from sparse volume management logic 95 which may include logic to recover a sparse volume. A request to provision a slice received by slice request management logic 142 may include a callback function and context information. Slice request management logic 142 works in conjunction with file system mapping driver APIs component 140 which in turns works in conjunction with mapped LUN driver 80 to process a request to provision a slice. When a request to provision a slice is processed by file system mapping driver 85, a callback provided by mapped LUN driver 80 is invoked. Further, mapped LUN driver 80 may then decide to either provision the slice by adding the requested slice or deny the request to provision the slice by using a set of APIs of file system mapping driver APIs 140. Further, slice request management logic 142 may then notify an operation (such as a recovery of a file system) to proceed based on the type of response received from mapped LUN driver 80.

Thus, in at least one embodiment of the current technique, slice request management logic 142 upon receiving a request to add a slice from either core file system logic 144 or sparse volume management logic 95, sends the request to mapped LUN driver 80 which may results into provisioning of the slice if the request is performed successfully A slice may be requested using a set of internal APIs of file system mapping driver APIs 140. A recovery of a file system may occur in two phases such that one phase recovers sparse volumes of the file system (also referred to herein as "volume recovery") and another phase recovers the file system (also referred to herein as "file system recovery"). If sparse volume management logic 95 sends a request to provision a new slice in order to resolve a conflict situation where at least two sparse volumes may point to the same slice, the new slice is provided to sparse volume management logic 95 for recovering the at least two sparse volumes. Similarly, if core file system logic 144 sends a request to provision a new slice in order to rebuild metadata and/or data of a file system in order to recover the file system, the new slice is provided to core file system logic 144.

Figure 8:
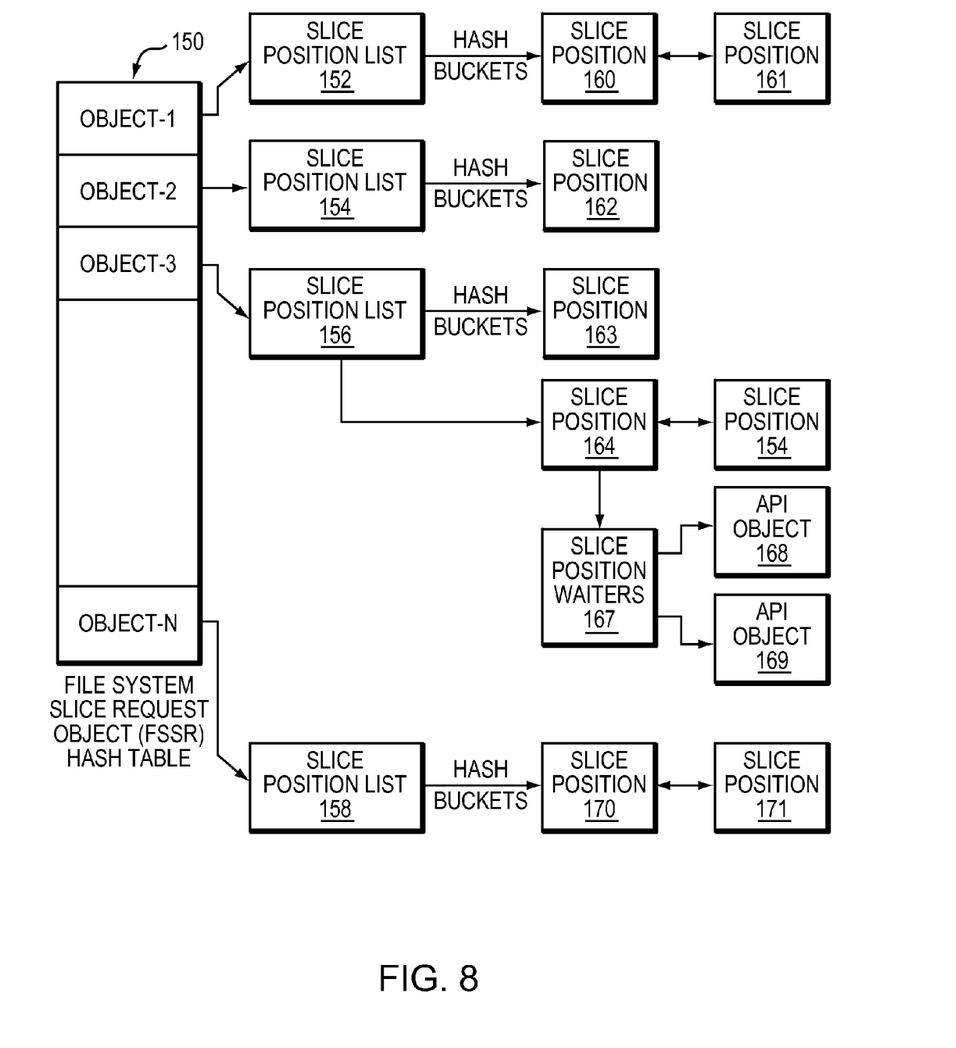

Referring to FIG. 8, shown is a more detailed representation of components that may be included in an embodiment using the techniques described herein. With reference also to FIG. 7, in at least some embodiments of the current technique, file system mapping driver 85 uses a logical object, file system slice request ("FSSR") object, for managing a request to provision a slice. A FSSR object is associated with a file system organized on a storage system using the file system identification number (also referred to herein as "fsid") of the file system. In at least some embodiments of the current technique, a table such as a hash table 150 may be used to store each FSSR object created in a storage system. A FSSR object is created for a file system even when the file system is not mounted. Thus, a file system does not need to be mounted in order to send a request to provision a slice. The file system identification number is used by a FSSR object in order to determine which file system is requesting a new slice. Further, file system mapping driver 85 differentiates between a request to provision a slice by a mounted file system and a request to provision a slice by an un-mounted file system which may be undergoing recovery to restore integrity of the file system.

In at least one embodiment of the current technique, a FSSR object for a file system may be created at the time the file system is mounted. In such a case, the FSSR object is associated with the file system identification of the file system such that when the file system requires a slice, a request to provision the slice is send to slice request management logic 142 along with a slice request callback and context information. Alternatively, in at least one embodiment of the current technique, a FSSR object for a file system may be created when the file system is being recovered by a file system recover logic of core file system logic 144 and requires a slice to recover the file system. Similarly, in at least one embodiment of the current technique, a FSSR object for a file system may be created when a sparse volume of the file system is being recovered by a sparse volume management logic 95 and requires a slice to recover the sparse volume.

Further, an internal slice request notification callback may be used to notify an operation which sends a slice request for provisioning a slice to notify the operation that the request to provision the slice has been processed. An operation may register a customized callback function with slice request management logic 142 such that appropriate operations defined in the customized callback function may be performed upon receiving a notification regarding a request to provision a slice.

In at least one embodiment of the current technique, hash table 150 manages FSSR objects created for managing requests for provisioning slices and providing the slices to logical objects requesting such slices. When file system recovery logic requires a slice for recovery of a file system, a determination is made as to whether a FSSR object corresponding to the file system already exists in the hash table 150. Upon determining that no such FSSR object exists, a new FSSR object is created and added to the hash table 150. However, if a FSSR object associated with the file system identification number of the file system exists in the hash table 150, a slice position list of the FSSR object is updated to indicate a logical position within the file system at which the request to add the new slice is received. A slice position list associated with a FSSR object for a file system stored in hash table 150 manages information regarding logical positions within the file system at which request for provisioning new slices are processed. Each entry in a slice position list refers to a slice request requesting a new slice at a specific position within a file system. A slice position list may be implemented as a hash table. For example, object-1 of hash table 150 refers to a FSSR object pointing to a slice position list 152 which includes slice requests 160, 161. For example, object-2 of hash table 150 refers to a FSSR object pointing to a slice position list 154 which includes slice request 162. For example, object-3 of hash table 150 refers to a FSSR object pointing to a slice position list 156 which includes slice requests 163, 164, 165. For example, object-n of hash table 150 refers to a FSSR object pointing to a slice position list 158 which includes slice requests 170, 171.

Further, in at least one embodiment of the current technique, slice request management logic 142 may include logic to determine whether multiple slice requests are received for a slice at the same position thereby avoiding adding duplicate requests to a slice position list for a FSSR object. Further, a client sending a slice request may provide a call back function and context information associated with the slice request. For example, slice position entry 164 in slice position list 156 for object-3 includes a notification function (e.g. slice position waiters 167) and context information (e.g. API objects 168, 169) for a request at slice position 164.

Further, in at least one embodiment of the current technique, slice request management logic 142 sends requests for each slice position entry of each slice position list of hash table 150 to mapped LUN driver 80 to allocate slices. If mapped LUN driver 80 is able to provision a slice, corresponding slice request completes successfully. However, if mapped LUN driver 80 fails to provision a slice, corresponding slice request fails and the failure condition is handled appropriately by slice request management logic 142.

Figure 9:
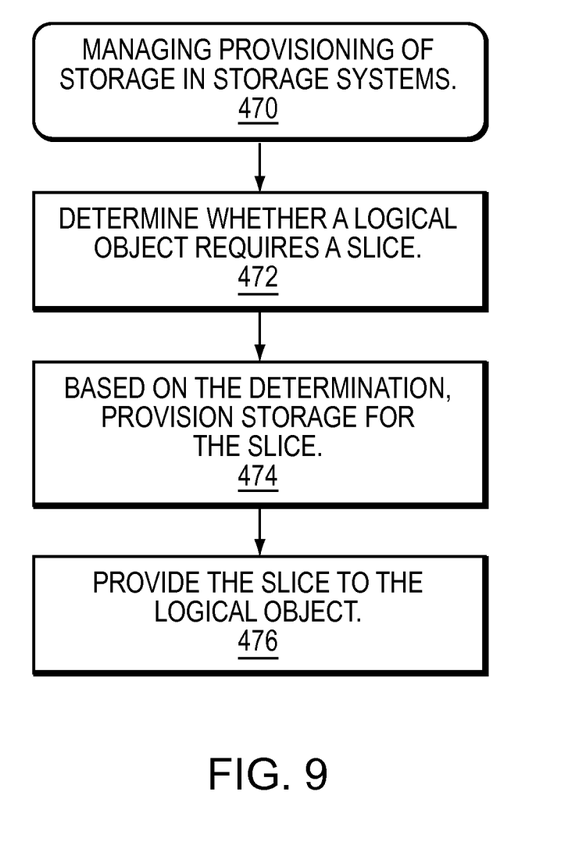
FIG. 9 is a flow diagram illustrating processes that may be used in connection with techniques herein.

Referring to FIG. 9, shown is a more detailed flow diagram illustrating managing provisioning of storage in storage systems. With reference also to FIGS. 7-8, provisioning of storage is managed in a storage system (step 470). A determination is made as to whether a logical object such as a file system or a sparse volume of a file system requires a slice (step 472). Further, based on the determination that the logical object requires a slice, a determination is made as to whether a slice request has been issued based on whether such request exists already in FSSR objects hash table 150. For example, if two slice requests are received for the same slice position, even though both slice requests may be added to FSSR objects hash table 150, only one slice request callback is provided to a client requesting slices. Based on the determination, a slice is allocated (step 476). The newly allocated slice is then provided to the logical object (step 476).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing provisioning of storage in storage systems, the method comprising:
determining whether a logical object requires a slice for recovering the logical object, wherein the slice is required for storing information required for recovering the logical object;
based on the determination, provisioning storage for the slice, wherein the slice is provisioned for the logical object irrespective of a state of the logical object, wherein the state of logical object indicates whether the logical object is mounted; and
providing the slice to the logical object.

2. The method of claim 1, wherein the logical object includes a file system and a sparse volume.

3. The method of claim 1, wherein a file system is associated with a set of sparse volumes.

4. The method of claim 1, wherein the logical object includes a set of slices, each slice of the set of slices is a logical representation of a subset of physical disk storage.

5. The method of claim 1, wherein the logical object resides on a storage system, wherein the storage system includes a disk drive system comprising a plurality of Redundant Array of Inexpensive Disks (RAID) systems, each RAID system of the plurality of RAID systems having a first disk drive and a second disk drive.

6. The method of claim 1, further comprising:
creating a request to provision the slice; and
adding the request to provision the slice to a slice request object table.

7. The method of claim 6, further comprising:
maintaining a slice position associated with the request to provision the slice.

8. The method of claim 6, further comprising:
upon completion of the request, sending a notification callback to an operation initiating the request to provision the slice.

9. The method of claim 1, wherein a mapped LUN driver provisions storage for a slice upon receiving a request to provision the slice from a file system mapping driver.

10. A system for use in managing provisioning of storage in storage systems, the system comprising:
first logic determining whether a logical object requires a slice for recovering the logical object, wherein the slice is required for storing information required for recovering the logical object;
second logic provisioning, based on the determination, storage for the slice, wherein the slice is provisioned for the logical object irrespective of a state of the logical object, wherein the state of logical object indicates whether the logical object is mounted; and
third logic providing the slice to the logical object.

11. The system of claim 10, wherein the logical object includes a file system and a sparse volume.

12. The system of claim 10, wherein a file system is associated with a set of sparse volumes.

13. The system of claim 10, wherein the logical object includes a set of slices, each slice of the set of slices is a logical representation of a subset of physical disk storage.

14. The system of claim 10, wherein the logical object resides on a storage system, wherein the storage system includes a disk drive system comprising a plurality of Redundant Array of Inexpensive Disks (RAID) systems, each RAID system of the plurality of RAID systems having a first disk drive and a second disk drive.

15. The system of claim 10, further comprising:
fourth logic creating a request to provision the slice; and
fifth logic adding the request to provision the slice to a slice request object table.

16. The system of claim 15, further comprising:
sixth logic maintaining a slice position associated with the request to provision the slice.

17. The system of claim 15, further comprising:
sixth logic sending, upon completion of the request, a notification callback to an operation initiating the request to provision the slice.

18. The sixth logic of claim 10, wherein a mapped LUN driver provisions storage for a slice upon receiving a request to provision the slice from a file system mapping driver.

* * * * *